United States Patent Office 3,442,985
Patented May 6, 1969

3,442,985
O-LOWER ALKYL-S-ANISYL CHLOROMETHYL-PHOSPHONODITHIOATES
Ralph B. Fearing, Bardonia, N.Y., assignor to Stauffer Chemical Company, New York, N.Y., a corporation of Delaware
No Drawing. Filed Oct. 13, 1965, Ser. No. 495,721
Int. Cl. C07f 9/40; A01n 9/36
U.S. Cl. 260—951                               5 Claims

ABSTRACT OF THE DISCLOSURE

O-alkyl-S-anisyl chloromethylphosphonodithioates represented by the general formula

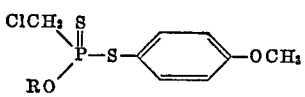

wherein R is lower alkyl. The compounds are useful as pesticides, for example, controlling insects and mites. Representative compounds are O-ethyl-S-(p-anisyl) chloromethylphosphonodithioate, O - isopropyl - S - (p-anisyl) chloromethylphosphonodithioate, O-isoamyl-S-(p-anisyl) chloromethylphosphonodithioate and O - n - propyl-S-(p-anisyl) chloromethylphosphonodithioate.

---

The present invention is concerned with a novel group of O - alkyl - S - anisyl chloromethylphosphonodithioates, their method of preparation and use as pesticides.

The novel pesticides may be represented by the general formula

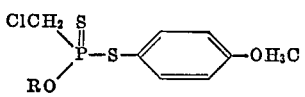

wherein R is lower alkyl. The lower alkyl radicals which are suitable for R are the straight and branched chain aliphatics having from 1 to 8 carbons and include for example, methyl, ethyl, isopropyl, octyl, and the like.

The general process for preparing the novel pesticides of the invention may be illustrated by the following reaction:

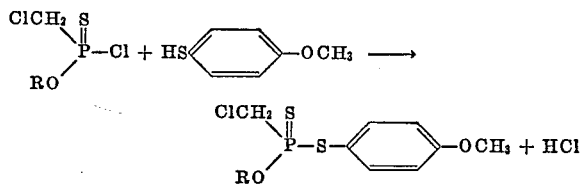

wherein R is the same as defined hereinbefore.

Preparation of the novel anisyl chloromethylphosphonodithioates involves reacting p-mercaptanisole with a chloromethylphosphonochloridothioate, preferably in the presence of an inert solvent such as benzene, toluene, acetone, butanone, and the like, and in the presence of a hydrogen halide acceptor such as sodium carbonate, triethylamine, pyridine, picoline, and the like. The reaction may be carried out at temperatures between 25° C. and 70° C., but 40° C. to 50° C. is preferred. The reaction is only mildly exothermic and thus the temperature may be easily controlled.

The following examples illustrate specific pesticides of the invention and their method of preparation, but should not be construed as limiting the broader aspects of the invention.

Example 1

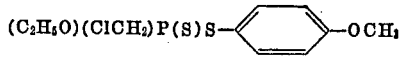

11.2 grams of p-mercaptoanisole (0.08 mol) and 15.8 grams of O-ethyl chloromethylphosphonochloridothioate (0.082 mol) were dissolved in 40 cc. of benzene contained in a reactor flask fitted with a thermometer and stirring rod. 8.3 grams of triethylamine (0.82 mol) were added dropwise to the mixture. A mildly exothermic reaction ensued so that an ice bath was necessary to maintain the temperature of the mixture at 40° C. After about 30 minutes when the addition was complete, the mixture was heated for two hours at 50° C. The reactants were then washed in a separatory funnel, twice with water, once with a 5% solution of sodium carbonate, and twice again with water. The product was dried and concentrated by evaporation to yield 24 grams of O-ethyl-S-(p-anisyl) chloromethylphosphonodithioate (.08 mol); having an index of refraction $N_D^{25}=1.5949$ and analysis of 10.15% P, 20.9% S, and 12.1% Cl as compared to 10.4% P, 21.6% S, and 11.97% Cl, theoretical.

The following specific compounds may be prepared in accordance with the procedure shown in Example 1, in the yields indicated. Sample analyses and indices of refraction are included in the examples.

Example 2

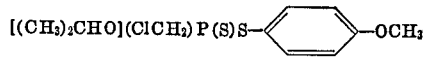

O - isopropyl - S-(p-anisyl) chloromethylphosphonodithioate; yield=100% of theory; having an index of refraction $N_D^{25}=1.5865$ and analysis of 9.8% P, 20% S, and 11.3% Cl, as compared to 9.97% P, 20.6% S, and 11.4% Cl, theoretical.

Example 3

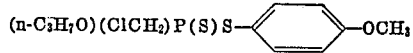

O - n - propyl - S-(p-anisyl) chloromethylphosphonodithioate; yield 93%; having an index of refraction $N_D^{25}=1.5910$ and analysis of 9.6% P, 19.8% S, and 11.2% Cl, as compared to 9.97% P, 20.6% S, and 11.4% Cl, theoretical.

Example 4

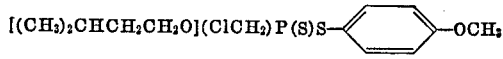

O - isoamyl - S - (p-anisyl) chloromethylphosphonodithioate; yield 83%; having an index of refraction $N_D^{25}=1.5713$ and analysis of 8.5% P, 18.2% S, and 9.4% Cl, as compared to 9.15% P, 18.9% S, and 10.5% Cl, theoretical.

Although the new chloromethylphosphonodithioates have been found to be generally active as pesticides, their activity against the housefly (*Musca domestica*) and two-spotted mite (*Tetranychus telarius*), is unexpectedly high. Pesticidal activity for the anisyl chloromethylphosphonodithioates is shown in Table I wherein the percentage kill among the pest species is reported for a specified quantity of candidate compound, expressed in micrograms (μg.—herein termed the bioassay test) or for a percentage concentration in aqueous dispersion (hereinafter termed the screening test). A slanted line is used to separate the percentage kill for the pest species shown on the left from the percentage concentration (screening) or total quantity (bioassay) shown on the right.

Insect species

Housefly—*Musca domestica*(Linn.)
American cockroach—*Periplaneta americana*(Linn.)
Salt-marsh caterpillar—*Estigmene acrea*(Drury)
Spotted milkweed bug—*Oncopeltus fasciatus*(Dallas)

Mite species

Two-spotted mite—*Tetranychus telarius*(Linn.)

TABLE I.—MORTALITY OF REPRESENTATIVE SPECIES OF COMMON INSECT ORDERS AND MITES

| Compound (example number, see supra) | M. domestica | P. americana | E. acrea | O. fasciatus | T. telarius | | |
| --- | --- | --- | --- | --- | --- | --- | --- |
| | | | | | Post Embryonic | Nymphs | Eggs |
| 1($\mu$ g.) | 88/10 | 50/0.1 | 50/0.1 | 10/0.1 | 95/0.01 | 100/0.1 | 50/0.1 |
| 2($\mu$ g.) | 68/10 | 100/0.1 | 50/0.01 | 100/0.05 | 100/0.01 | 98/0.1 | 100/0.1 |
| 3($\mu$ g.) | 50/10 | 20/0.1 | 50/0.03 | 20/0.1 | 90/0.01 | 100/0.1 | 50/0.1 |
| 4($\mu$ g.) | 50/30 | 50/0.1 | 100/0.05 | 20/0.1 | 100/0.1 | 100/0.1 | |

In the screening tests for the insect species of Table I, from ten to twenty-five insects were caged in cardboard mailing tubes 3⅛″ diameter and 2⅝″ tall. The cages were supplied with cellophane bottoms and screen tops. Food and water were supplied to each cage. Dispersions of the test compounds were prepared by dissolving one half gram of the toxic material in 10 ml. of acetone. This solution was then diluted with water containing 0.0175% v./v. Sponto 221, an emulsifying agent, the amount of water being sufficient to dilute the active ingredients to a concentration of 0.1% or below. The test insects were then sprayed with this dispersion. After twenty-four and seventy-two hours, counts were made to determine living and dead insects.

Some of the compounds which showed high mortality on house flies in the screening test were bioassayed on *M. domestica*. In this test, a known quantity of the toxicant was placed in a confined area. The same cages were employed as for the fly screening test. A weighed amount of the toxicant was placed in pyrex petri dishes having a surface area of 18.8 sq. centimeters along with 1 ml. of acetone. After the solvent was evaporated by air-drying, a cage containing groups of twenty-five female flies, three to five days old, was placed over the residue. Counts of living and dead insects were made forty-eight hours after initiation of the test.

Compounds which had an LD50 value (i.e., 50% of test species killed) per concentration of 50 $\mu$g. or less on house flies, were selected for contact stomach screening on the salt-marsh caterpillar. Dock leaves approximately five inches long were dipped in aqueous suspensions of the test materials for ten seconds. The leaves were then placed in one pint food containers with the stems projecting through small holes in the bottoms into vials containing water. Five 8 to 10 day-old salt-marsh larvae were introduced and the containers were closed with a petri dish lid. Mortality readings were taken at twenty-four and seventy-two hours. The results are shown in Table I.

Although the above tests were accomplished with aqueous dispersions, the toxic compounds can also be used commercially in the form of aqueous solutions when appreciably soluble, non-aqueous solutions, wettable powders, vapors, and dusts as best suited to the conditions of use. In many applications, the material may even be used in its pure, undiluted form.

When used herein the term "pest" is intended in the restricted sense generally recognized in the art as applying to the lower forms of life customarily controlled by chemical means and excluding the higher animals, the vertebrates, for example, rodents, birds, and larger forms which are more commonly controlled by mechanical means such as traps. It will be apparent to one skilled in the art that the toxic activity demonstrated hereinbefore on various test species in indicative of activity with species and orders not specifically shown.

The foregoing description is given for clearness of understanding only, and no unnecessary limitations should be understood therefrom, as modifications will be obvious to those skilled in the art.

I claim:

1. A compound having the formula

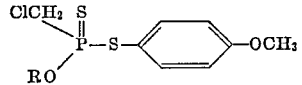

wherein R is lower alkyl.

2. O-ethyl-S-(p-anisyl) chloromethylphosphonodithioate.

3. O-isopropyl-S-(p-anisyl) chloromethylphosphonodithioate.

4. O-n-propyl-S-(p-anisyl) chloromethylphosphonodithioate.

5. O-isoamyl-S-(p-anisyl) chloromethylphosphonodithioate.

References Cited

UNITED STATES PATENTS 3,248,459  4/1966  Lorenz _____ 260—951 XR
3,361,855  1/1968  Schrader _____ 260—961 XR CHARLES B. PARKER, *Primary Examiner.*

ANTON H. SUTTO, *Assistant Examiner.*

U.S. Cl. X.R.
260—73; 424—214